United States Patent
Martin

[11] 3,934,726
[45] Jan. 27, 1976

[54] BALE CARRIER
[76] Inventor: Leon C. Martin, R.F.D. 2, Box 36, Greenfield, Iowa 50849
[22] Filed: Apr. 29, 1974
[21] Appl. No.: 465,421

[52] U.S. Cl............ 214/131 A; 214/147 R; 214/654
[51] Int. Cl.².......................................... A01D 89/00
[58] Field of Search.... 214/654, 147 R, 144, 131 R, 214/131 A, 766, 768, 778, DIG. 12

[56] References Cited
UNITED STATES PATENTS

| | | | |
|---|---|---|---|
| 2,578,802 | 12/1951 | Heidrick | 214/654 X |
| 3,207,338 | 9/1965 | Felburn | 214/131 R |

FOREIGN PATENTS OR APPLICATIONS

| | | | |
|---|---|---|---|
| 250,723 | 9/1962 | Australia | 214/147 R |

Primary Examiner—Robert J. Spar
Assistant Examiner—George F. Abraham
Attorney, Agent, or Firm—Zarley, McKee, Thomte, Voorhees & Sease

[57] ABSTRACT

A bale carrier comprising a first pipe having a second pipe selectively rotatably mounted therein with the ends of the second pipe protruding outwardly from the first pipe. The ends of the second pipe are pivotally connected to the rearward ends of a pair of lifting arms of a tractor three-point hitch apparatus. A tine is secured to each end of the second pipe and extends rearwardly therefrom for piercing engagement with the hay bale. A support frame extends upwardly from the first pipe and has a hydraulically operated cylinder mounted thereon which controls a pivotal hook arm extending rearwardly therefrom which is adapted to engage the upper portion of the bale. The support frame is pivotally connected to the rearward end of the third lifting arm of the three-point hitch apparatus.

4 Claims, 7 Drawing Figures

U.S. Patent   Jan. 27, 1976   3,934,726
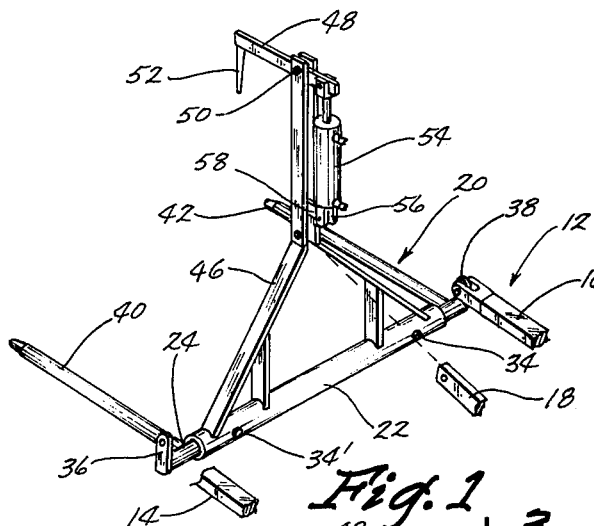
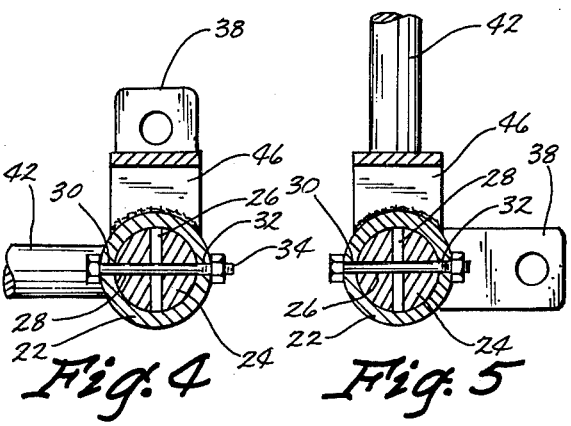
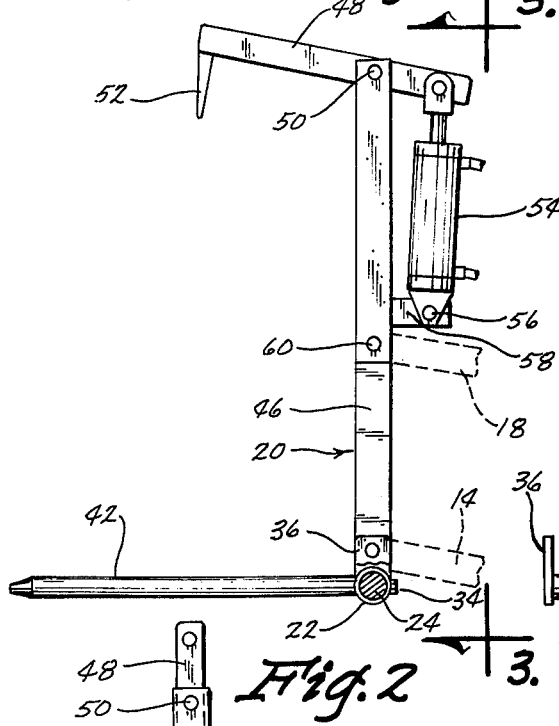
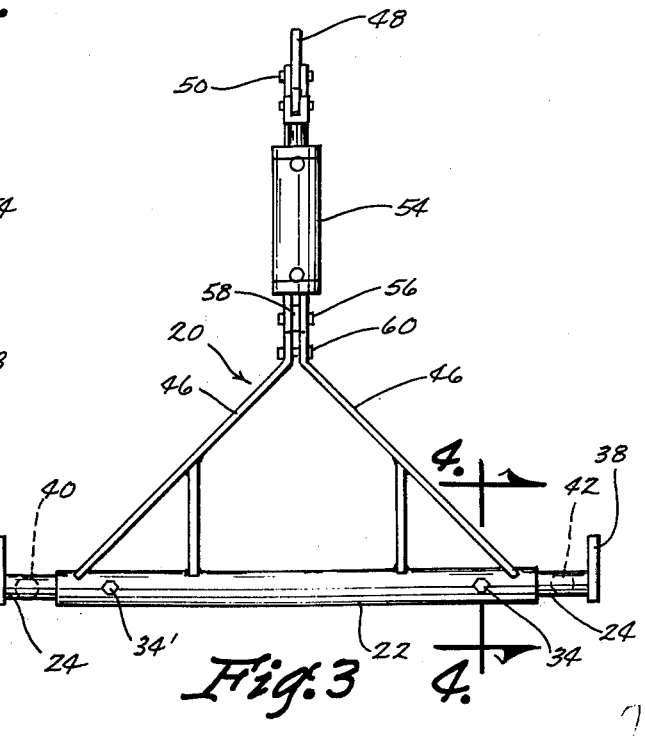
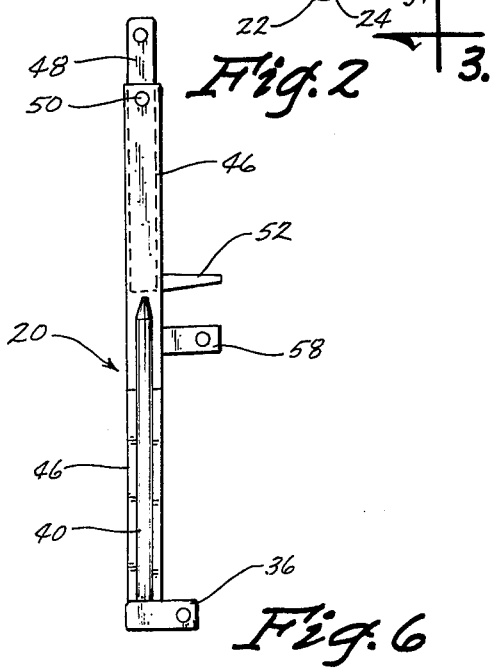

BALE CARRIER

BACKGROUND OF THE INVENTION

This invention relates to a bale ball carrier and more particularly to a bale carrier which may be mounted on a three-point hitch of a tractor.

Hay bales are being formed in extremely large sizes and are quite difficult to handle. Lifting apparatuses have been provided for transporting the large bales but the conventional apparatus requires that support arms or the like be extended beneath the bale prior to the bale being lifted from the ground. This is extremely difficult since many of the bales are frozen to the ground or are covered with snow. Further, the bales tend to rot and flatten at the lower ends which makes it extremely difficult to position the support arms therebeneath. Additionally, snow and mud tend to collect on the support arms.

Therefore, it is a principal object of the invention to provide an improved bale carrier.

A further object of the invention is to provide a bale carrier which may be quickly and easily attached to the three-point hitch of a tractor.

A further object of the invention is to provide a bale carrier which has a pair of spaced apart tines which pierce the bale above the lower end thereof.

A further object of the invention is to provide a bale carrier device which is easy to use.

A still further object of the invention is to provide a bale carrier which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the bale carrier:

FIG. 2 is a side view of the bale carrier with portions thereof cutaway to more fully illustrate the invention:

FIG. 3 is a top elevational view of the bale carrier:

FIG. 4 is an enlarged sectional view seen on lines 4 — 4 of FIG. 3:

FIG. 5 is an enlarged sectional view similar to FIG. 4 except that the tines have been rotated to an inoperative position:

FIG. 6 is a side view of the apparatus illustrating the bale engaging tines and hook in an inoperative or stored condition; and FIG. 7 is a side view of a tractor having the bale carrier of this invention mounted thereon.

DESCRIPTION OF THE PREFERRED EMBODIMENT

The numeral 10 refers generally to a conventional tractor having a conventional three-point hitch apparatus mounted on the rearward end thereof and which is generally referred to by the reference numeral 12. Three-point hitch 12 comprises lifting arms 14, 16 and 18 which extend rearwardly from the tractor and which are conventionally operated by the tractor hydraulic power system.

The numeral 20 refers generally to the bale carrier of this invention which is adapted to be secured to the three-point hitch apparatus 12. The numeral 22 refers to a pipe having pipe 24 selectively rotatably mounted therein and having its opposite ends extending outwardly therefrom as seen in FIG. 1. As seen in FIGS. 4 and 5, pipe 24 is provided with a pair of bores 26 and 28 extending therethrough in a transverse relationship. The bores 26 and 28 are adapted to be selectively registered with the openings 30 and 32 formed in pipe 22 so that pipe 24 may be selectively rotated 90° and held in either of the two positions by bolt 34 extending therethrough. A bolt 34' extends through the other end of the pipes 22 and 24 in identical fashion to that just described.

Brackets 36 and 38 are welded to the outer ends of pipe 24 and are pivotally connected to the rearward ends to the lifting arms 14 and 18 respectively. Tines 40 and 42 are welded to the outer ends of pipe 24 and extend rearwardly therefrom as also seen in the drawings. The tins 40 and 42 are provided with sharpened rearward ends to permit the tines to pierce the hay bale which is referred to generally by the reference numeral 44.

The numeral 46 refers generally to a support frame which is secured to pipe 22 by welding or the like such as illustrated in FIG. 1 and which extends upwardly therefrom. An arm 48 is pivotally connected to the upper end of frame 46 at 50. A hook 52 is welded to the rearward end of arm 48 as seen in the drawings and a hydraulic cylinder 54 is pivotally connected to the forward end of arm 48. The other end of hydraulic cylinder 54 is pivotally connected to a bracket 56 which is rigidly secured to the support frame 46. The hydraulic cylinder 54 is fluidly connected to the tractor hydraulic system. so that movement of the cylinder rod thereof causes the arm 48 to pivotally move upwardly and downwardly with respect to the support frame 46. Lifting arm 18 is pivoally connected to support frame 46 at 60.

The normal method of operation is as follows. The carrier 20 is easily connected to the tractor three-point hitch system in a few minutes by simply connecting the lifting arms 14, 16 and 18 to the apparatus as previously described. The hydraulic cylinder 54 is also connected to the tractor hydraulic system. When it is desired to move a bale, the hydraulic cylinder 54 would be actuated so that the rearward end of arm 48 is pivotally moved upwardly. The three-point hitch 12 is also operated so that the tines 40 and 42 are supported above the ground. The tractor 10 is then backed towards the bale 44 so that the tines 40 and 42 pierce the bale above the lower end thereof. When the tines 40 and 42 have completely pierced the bale 44, the tractor is stopped and the hydraulic cylinder 54 is actuated to cause the rearward end of the arm 48 to pivotally move downwardly so that the hook 52 pierces the upper portion of the bale to cause the bale to be securely grasped.

The three-point hitch apparatus 12 may then be actuated to raise the bale out of ground engagement with the bale then being transported to the desired location. The bale is released from the carrier by simply operating the three-point hitch apparatus to cause the bale to be lowered into ground engagement or on to a low-boy trailer. Hydraulic cylinder 54 is then actuated to move the hook 52 out of engagement with the upper portion of the bale 44. The tractor 10 is then driven forwardly with respect to the bale so that the tines 40 and 42 are withdrawn therefrom. Thus, it is not necessary that the tines 40 and 42 engage the ground at any time during the loading or unloading operation which prevents snow and mud from accumulating therein. The tines 40 and 42 are also maintained out of engagement with the bed of the trailer since the tines are positioned about the lower end of the bale.

The bolts 34 and 34' permit the tines 40 and 42 to be either positioned in the working position such as seen in FIG. 2 or the inoperative position such as seen in FIG. 6 as previously described. The arm 48 may also be positioned in an inoperative position by removing the hydraulic cylinder 54 from the carrier. The weight of the arm 48 causes the arm 48 to automatically pivotally move downwardly to the position illustrated in FIG. 6. The carrier does not interfere with the normal towing use of the tractor when the tines 40, 42 and arm 48 are positioned in their non-working positions.

Thus it can be seen that a bale carrier device has been provided which accomplishes at least all of its stated objectives.

I claim:

1. A bale carrier for use with a tractor three-point hitch having three lifting arms extending rearwardly therefrom comprising,
    an elongated first horizontally disposed support means, said first support means being transversely disposed with respect to the longitudinal axis of the tractor,
    a pair of tine members operatively secured to said first support means adjacent the opposite ends thereof and extending rearwardly therefrom for piercing engagement with the bale above the lower end thereof,
    first connection means for operatively connecting said first support means to two of the lifting arms,
    second support means extending upwardly from said support means, second connection means for connecting said second support means to the third lifting arm,
    an arm means pivotally secured to said second support means adjacent the upper end thereof and extending rearwardly therefrom,
    means on said arm means for engagement with the upper portion of the bale,
    means for selectively pivotally moving said arm means,
    said first support means comprising a first pipe means and wherein a second pipe means is selectively rotatably mounted in said first pipe means and has its opposite ends positioned outwardly of the opposite ends of said first pipe means, the two lifting arms being secured to the opposite ends of said second pipe means, one tine member of said pair of tine members being secured to each end of said second pipe means.

2. The bale carrier of claim 2 wherein said first and second pipe means have registering openings formed therein for receiving a bolt means to selectively maintain said second pipe means in at least two positions relative to said first pipe means.

3. The bale carrier of claim 2 wherein said registering openings are provided to selectively maintain said pair of tine members in a substantially vertically disposed, non-working position.

4. A bale carrier for use with a tractor three-point hitch having three lifting arms extending rearwardly therefrom comprising,
    an elongated first horizontally disposed support means, said first support means being transversely disposed with respect to the longitudinal axis of the tractor,
    a pair of tine members operatively secured to said first support means adjacent the opposite ends thereof and normally extendly rearwardly therefrom for piercing engagement with the bale above the lower end thereof, said tine members being selectively rotatably mounted relative to said first support means so that said tine members may be moved from a rearwardly extending working position to an upwardly extending inoperative position,
    first connection means for operatively connecting said first support means to two of the lifting arms,
    second support means extending upwardly from said support means, second connection means for connecting said second support means to the third lifting arm,
    an arm means pivotally secured to said second support means adjacent the upper end thereof and extending rearwardly therefrom,
    means on said arm means for engagement with the upper portion of the bale,
    a hydraulic cylinder connected to said arm means,
    means for selectively pivotally moving said arm means,
    said arm means assuming a substantially vertically disposed non-working position when said hydraulic means is disconnected therefrom.

* * * * *